United States Patent [19]
Kondo

[11] Patent Number: 5,386,529
[45] Date of Patent: Jan. 31, 1995

[54] DIGITAL SIGNAL PROCESSOR FOR USE IN SOUND QUALITY TREATMENT BY FILTERING

[75] Inventor: Atsushi Kondo, Yokohama, Japan

[73] Assignee: Kabushiki Kaisha Toshiba, Kawasaki, Japan

[21] Appl. No.: 877,107

[22] Filed: May 1, 1992

[30] Foreign Application Priority Data

May 2, 1991 [JP] Japan .................................. 3-100799

[51] Int. Cl.$^6$ ...................... G06F 12/00; G06F 15/31; H03G 3/00; G10H 7/10
[52] U.S. Cl. .................. 395/400; 364/724.10; 364/724.16; 364/DIG. 1; 381/62; 381/63; 84/603; 84/630
[58] Field of Search ...................... 381/62, 63; 84/630, 84/DIG. 26, 603, 629; 395/400; 364/724.10, 724.16

[56] References Cited

U.S. PATENT DOCUMENTS

| | | | |
|---|---|---|---|
| 4,731,835 | 3/1988 | Futamase et al. | 381/63 |
| 4,828,463 | 5/1989 | Kakishita et al. | 381/51 |
| 4,888,808 | 12/1989 | Ishikawa et al. | 351/103 |
| 4,947,725 | 8/1990 | Kawashima et al. | 84/DIG. 26 |
| 5,086,475 | 2/1992 | Kutaragi et al. | 381/51 X |
| 5,091,951 | 2/1992 | Ida et al. | 381/63 |
| 5,201,005 | 4/1993 | Matsushita et al. | 381/63 |
| 5,216,718 | 6/1993 | Fukuda | 381/63 X |
| 5,255,323 | 10/1993 | Ishihara et al. | 381/63 X |
| 5,293,611 | 3/1994 | Wada | 395/425 |

OTHER PUBLICATIONS

IEICE Technical Report, EA 90-66, (lines 15-34 of p. 35) "Audio DSP and Digital Amplifier Applications", Takaki (Dec. 13, 1990).
Users Manual for uPD6380, IEU-652, (pp. 54-57) Chap. 4, Sec. 4.2.1, "Program Ram and Coefficient Data Ram Rewriting" Chap. 4, Sec. 4.2.2, Coefficient Data Rewriting, (Dec. 1988).

*Primary Examiner*—Jack B. Harvey
*Assistant Examiner*—Michael A. Whitfield
*Attorney, Agent, or Firm*—Oblon, Spivak, McClelland, Maier, & Neustadt

[57] ABSTRACT

A digital signal processor in which the control device transmits to and writes into the buffer memory the data necessary for multiplication or for generating addresses in the external memory, and then the data in the buffer memory is written into the internal memory during a single sampling period. This processing device contains an address comparator that compares the address set by the control device in the internal memory into which the data in the buffer memory is written, with the address in the internal memory controlled by the program, and then that produces control signals to write the data read from the buffer memory into the internal memory. The data read from the buffer memory is written into the internal memory, and is also used for multiplication or for generating addresses in the external memory.

9 Claims, 9 Drawing Sheets

FIG. 12

DIGITAL SIGNAL PROCESSOR FOR USE IN SOUND QUALITY TREATMENT BY FILTERING

BACKGROUND OF THE INVENTION

1. Field of the Invention

This invention relates to a digital signal processor (DSP) best suited for the equalization of acoustic signals, the reproduction of sound field, the addition of reverberation, etc.

2. Description of the Related Art

In a DSP used for control of sound quality through various types of filtering, including graphic equalizers, a desired sound quality is obtained by changing the coefficient data on the filters. For a DSP used to reproduce a sound field space that gives the feeling of being at a live performance in a concert hall or the like, the reproduction of sound field or the addition of reverberation is achieved, simulating its echo pattern or impulse response. To achieve this, it is necessary for the DSP to change the data (the multiplier's coefficient data or the RAM's offset address data) necessary for multiplication or for address generation for the data delay RAM, in accordance with the music software and the conditions of the listening room.

Figure 1:
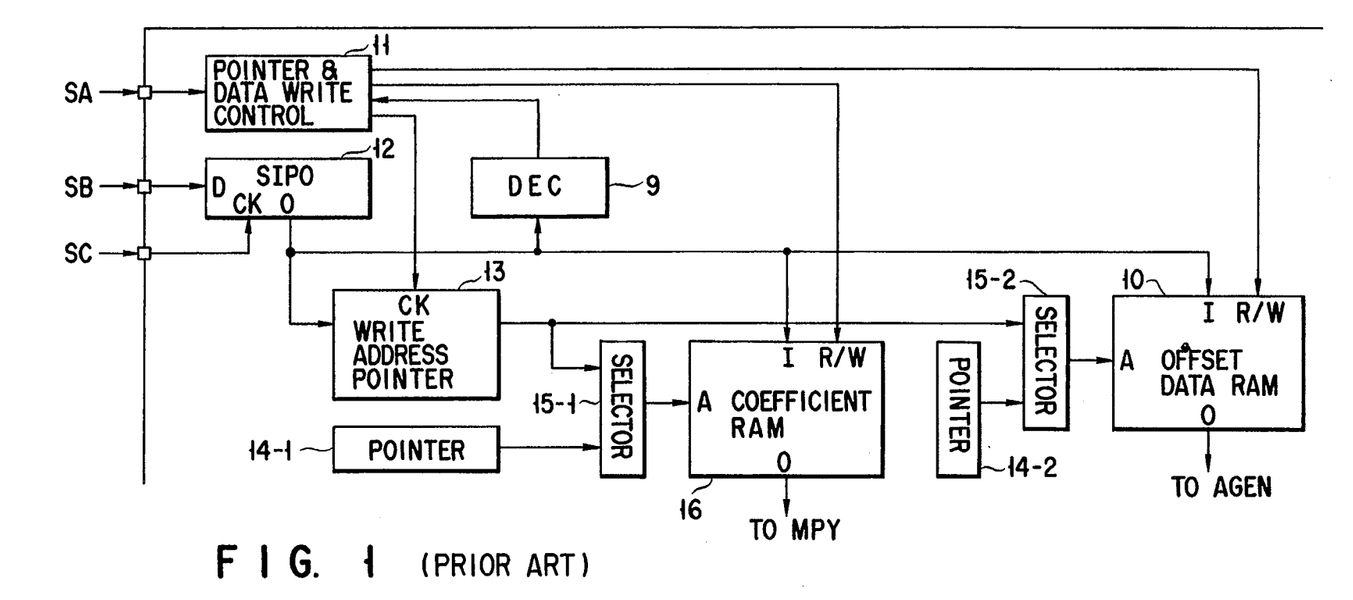
FIG. 1 is a block diagram of a conventional DSP, centering around the circuitry associated with data change, with the aim of explaining a first method of converting data.
Figure 3:
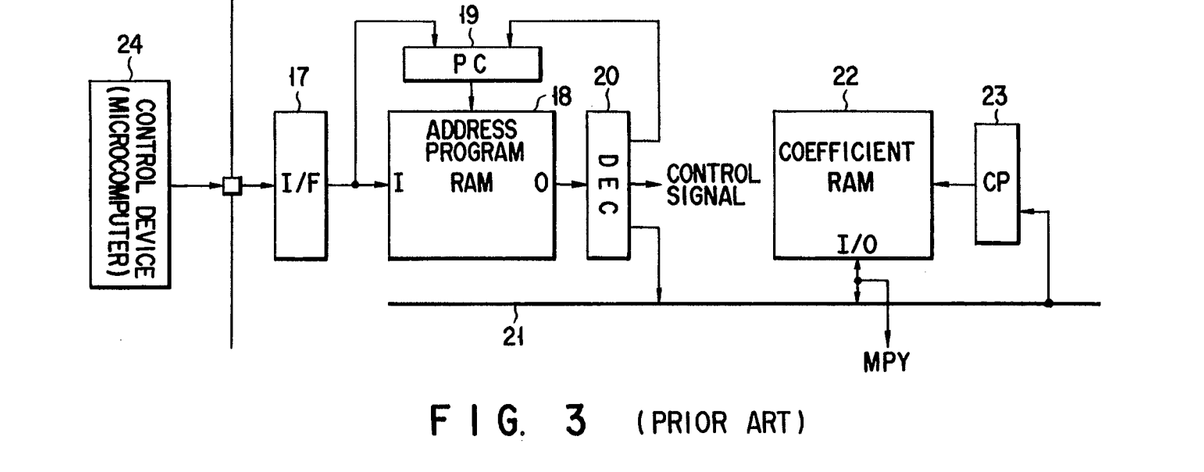
FIG. 3 is a block diagram of a conventional DSP, centering around the circuitry associated with data change, with the aim of explaining a second method of converting data.

To change the above data, the circuits as shown in FIGS. 1 and 3 are used. Each of FIGS. 1 and 3 show a portion of a conventional DSP, centering on the circuitry related to data change.

Figure 2:
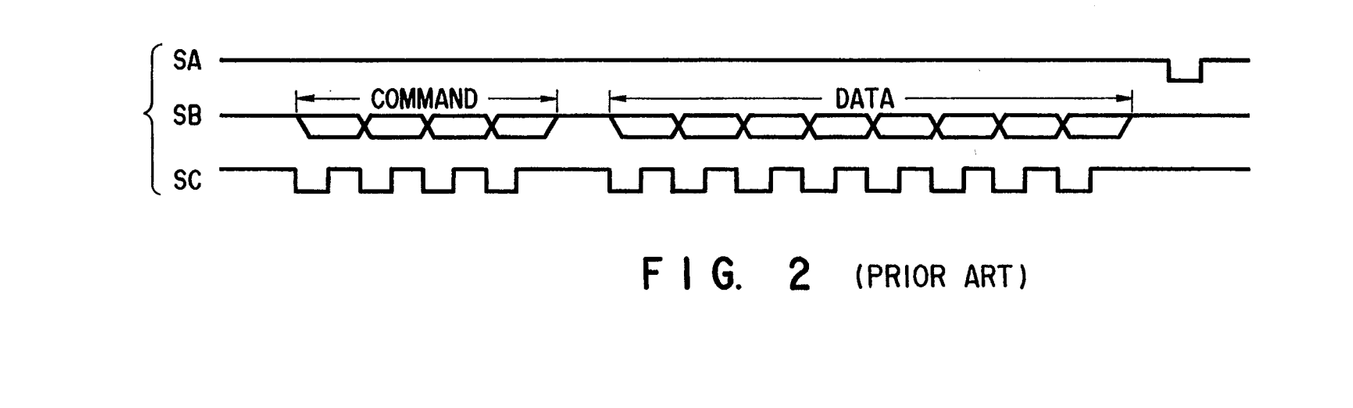
FIG. 2 is a timing chart for explaining the operation of the circuit of FIG. 1.

The circuit of FIG. 1 rewrites the data based on the data latch pulses used when the control device such as a microcomputer transmits the data to be changed. This circuit is composed of a pointer & data write control circuit 11, a serial input register (SIPO) 12, a decoder (DEC) 9, a write address pointer 13, pointers 14-1 and 14-2, selectors 15-1 and 15-2, a coefficient RAM 16 and an offset data RAM 10. The circuit thus constructed is supplied with a data latch pulse SA used to take in the data, command and data SB, and data shift clock SC, as shown in FIG. 2. The data latch pulse is supplied to the pointer & data write control circuit 11, the output of which is supplied to the control input terminal CK of the write address pointer 13 and the read/write signal input terminals R/W of the coefficient RAM 16 and the offset data RAM 10. The serial input register 12 receives the command and data SB at its data input terminal D and the data shift clock SC at its clock input terminal CK. The command from the output terminal O of the register 12 is supplied to the decoder 9 while the data is supplied to the write address pointer 13 and data input terminals I of the RAMs 16 10. The decoder 9 is decodes the command from the register 12, thus producing a write control signal which data is to be written into the pointer 13 and RAMs 16 and 10. On the other hand, the program sets read addresses in the pointers 14-1 and 14-2, respectively. The addresses from the pointers 13 and 14-1 are supplied to the selector 15-1, which then selects one of those addresses and supplies it to the address input terminal A of the RAM 16. The data read out of the output terminal O of the RAM 16 is supplied to a multiplier (MPY). The addresses from the pointers 13 and 14-2 are supplied to the selector 15-2, which then selects one of those addresses and supplies it to the address input terminal A of the RAM 10. The data read out of the output terminal O of the RAM 10 is supplied to an address generator circuit (AGEN) that produces addresses for an externally connected RAM.

With this configuration, to change the data, the selectors 15-1 and 15-2 select the pointer 13. The command and data SB is read into the serial input register 12 in synchronization with the shift clock pulse SC. When the data latch pulse goes to the low level, the output of the pointer & data write control circuit 11 brings the RAM 16 or 10 into the write mode and the pointer 13 is into the active state. At this time, the command from the register 12 is supplied to the decoder 9, which in turn decodes it, generates an address in the selected RAM 16 or RAM 10, and supplies the address to the input terminal A of the selected RAM 16 or RAM 10. This allows the data from the register 12 to be stored sequentially into the location with the address in the selected RAM 16 or RAM 10 specified by the pointer 13, thereby rewriting the data.

In reading data, the selectors 15-1 and 15-2 select the pointers 14-1 and 14-2, which in turn specifies an address in the RAM 16 or RAM 10. From the location with this address, the data is read and supplied to the multiplier (MPY) or the address generator circuit (AGEN).

With this arrangement, however, the data write signal is produced using the data latch pulse SA, so that it is unknown where the data write signal appears in the progress of the program. There may be a case where the data write signal appears in the course of processing or computing signals. Should this happen, it is impossible to read the data necessary for calculation or access to the data delay RAM, which results in abnormal signal processing, leading to the interruption of sound or the generation of noise.

In the circuit of FIG. 3, the instruction RAM corresponding to a single unit of signal processing is provided with an empty area that is not used for signal processing, but stores data, and the rewriting of data is done by a conditional branch process. This type of DSP is disclosed in, for example, User's Manual for μPD6380, IEU-652 Chap. 4, Sec. 4. 2. 1, "Program RAM and Coefficient Data RAM Rewriting," and Chap. 4, Sec 4. 2. 2, "Coefficient Data RAM Rewriting," December, 1988. This circuit is made up of an interface circuit (I/F) 17, a program RAM (instruction RAM) 18, a program counter (PC) 19, an instruction decoder (DEC) 20, a data bus 21, a coefficient RAM 22, and a coefficient RAM pointer (CP) 23. The data from a control device 24 such as a microcomputer is supplied to the data input terminal I of the program RAM (PRAM) 18 via the interface circuit 17, while the write PC address is supplied to the program counter 19. The output of the counter 19 is supplied to the address input terminal of the PRAM 18. The output terminal O of the PRAM 18 is connected to the instruction decoder 20. The instruction read from the PRAM 18 is decoded by the decoder 20, which produces a jump address, the control signal for each circuit, and immediate data. The jump address is supplied to the program counter 19. The immediate data is supplied onto the data bus 21, to which the data input/output terminal I/O of the coefficient RAM 22 and its pointer 23 are connected. The coefficient data read from the coefficient RAM 22 is supplied to, for example, a multiplier (MPY) (not shown).

Figure 4:
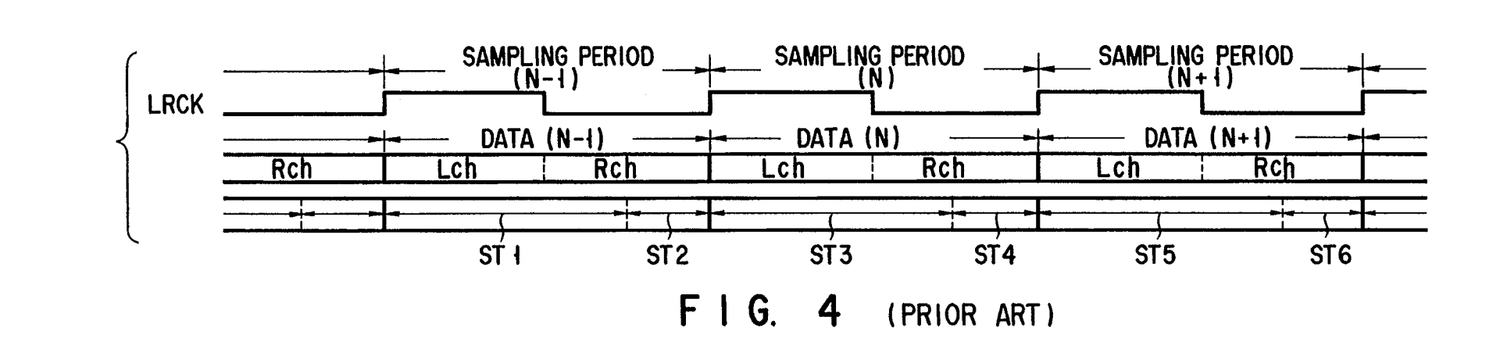
FIG. 4 is a timing chart for explaining the operation of the circuit of FIG. 3.

The circuit of FIG. 3 is set with sampling periods $N-1, N, N+1, \ldots$ by channel clock LRCK indicating the sampling cycle as shown in FIG. 4. During the "H" level period of this sampling cycle, the left-channel (Lch) data is input to the circuit; during the "L" level period of the sampling cycle, the right-channel (Rch) data is input to the circuit. Each sampling period contains signal processing steps ST1, ST3, ST5, ... and rewriting steps for coefficient data or offset data ST2, ST4, ST6, ...

Since the rewriting of data in the coefficient RAM 22 is done using a particular instruction (an immediate data load instruction), as many instructions as the data items to be rewritten are to be written into the program area in the PRAM 18 corresponding to the data rewrite execution steps. This instruction data for rewriting is written from the external control device (microcomputer) 24 into the PRAM 18 via the interface circuit 17. At the beginning of the data rewrite execution program, an instruction is placed which sets an address at which rewriting starts.

Control remains stopped at the conditional operation instruction without executing the data rewrite program until the microcomputer 24 has finished writing into the PRAM 18 as much rewrite instruction data as the amount of data to be rewritten by the conditional operation instruction (for example, a conditional jump instruction) placed at the end of the signal processing program.

Figure 5:
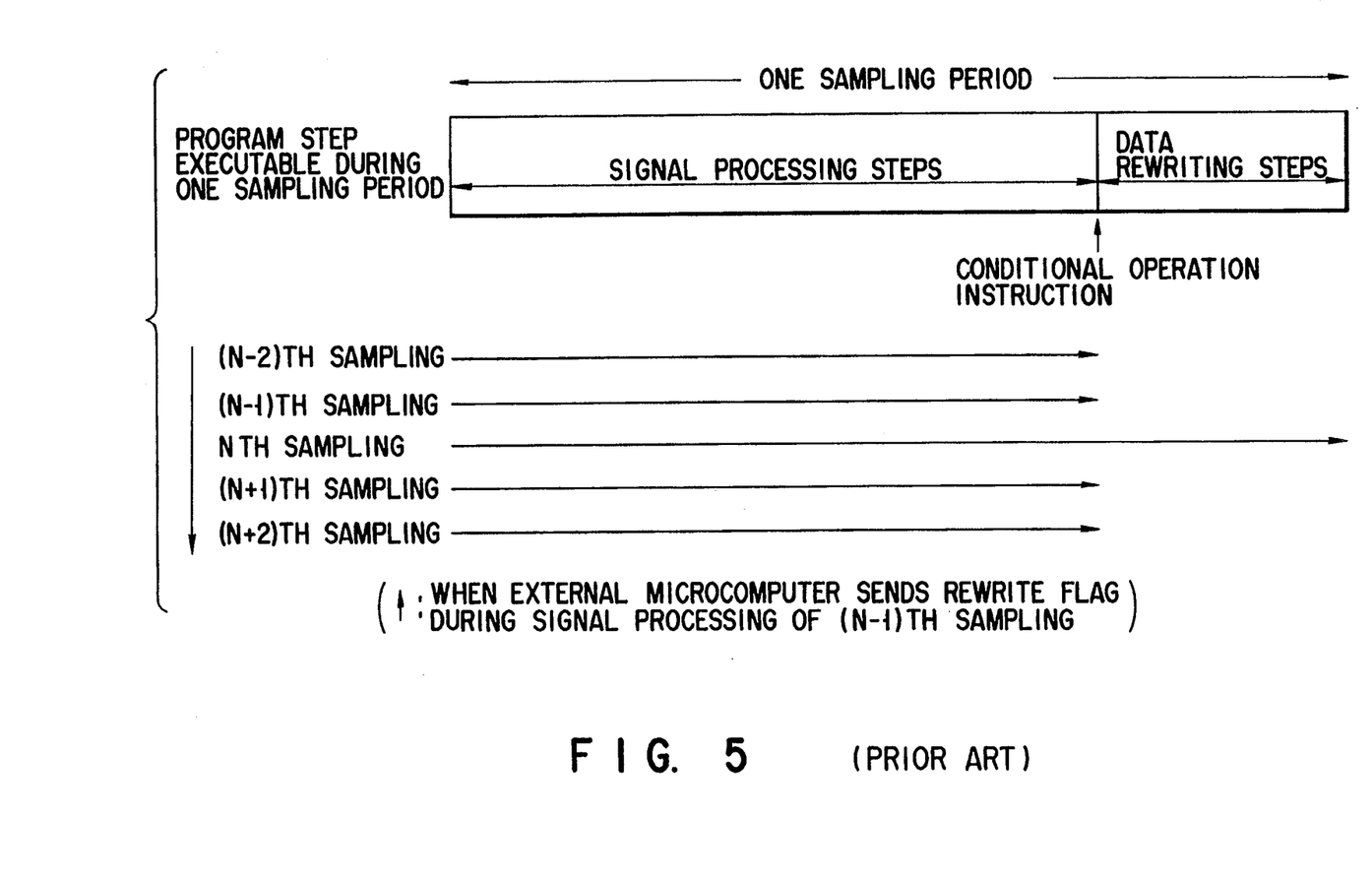
FIG. 5 shows the relationship between the signal processing steps and the data rewriting steps when a rewrite request flag is sent from the microcomputer in the course of processing the signal of (N−1)th time sampling, with a view to explaining the operation of the FIG. 3 circuit.

When the microcomputer 24 has completed rewriting that amount of data into the PRAM 18, it sends a rewrite request flag to the DSP. After the signal processing step has be executed during the sampling period (the Nth sampling in FIG. 5) next to the sampling during which the DSP has received that rewrite flag, the data rewrite step is executed by means of the conditional operation step. After all data has been rewritten, the rewrite request flag is cleared, and during the next sampling period and later, only signal processing steps will be executed as described earlier.

The number of program steps the DSP can execute during a single sampling period is finite. Using all such a finite number of sampling steps for signal processing allows the DSP to provide its full power. In the method shown in FIGS. 3 to 5, however, instead of using all program steps, executable during one sampling period, for signal processing, those steps are divided into signal processing steps and data (coefficient data or offset address data) rewrite program steps. The data is rewritten by means of a conditional operation instruction. Thus, the greater the amount of data to be rewritten, the more the DSP's signal processing capability reduces. This imposes on the control device 24 the serious burden of transmitting an instruction each time a parameter is rewritten.

In addition, the aforementioned two methods have disadvantages in that, particularly in the case of the gain control coefficients to be rewritten, the waveform of the acoustic signal may be discontinuous with the timing that the coefficient data changes, creating noises.

SUMMARY OF THE INVENTION

Accordingly, an object of the present invention is to provide a digital signal processor capable of changing data, if necessary, without creating noises.

Another object of the present invention is to provide a digital signal processor capable of making full use of the signal processing period of time without degrading the signal processing capability.

A further object of the present invention is to provide a digital signal processor that allows the operator to smoothly change the frequency characteristics of the equalizer, the reproduction of sound field, or the characteristics of added reverberation, if necessary, while listening to music without introducing noises.

The foregoing objects are accomplished by providing a digital signal processor, in which the control device sequentially transmits to and writes into a buffer memory the data necessary for multiplication or for address generation for an external memory, and then the data in the buffer memory is written into the internal memory during a single sampling period, and which comprises: first means for generating control signals to write the data read from the buffer memory into the internal memory by comparing the address set by the control device in the internal memory into which the data in the buffer memory is written, with the address in the internal memory controlled by the program; and second means for writing the data read from the buffer memory into the internal memory and also using the same data for multiplication or for address generation for the external memory.

With such a configuration, it is possible to prevent the output of the internal memory to the register from being interrupted in the course of comparing the address in the buffer memory with the address in the internal memory controlled by the program and then writing the data from the buffer memory into the internal memory, based the output of the buffer memory. The processing of data at the time of the acoustic signal crossing the zero level causes no noise. Further, use of no empty area for data conversion during the signal processing period achieves full use of the signal processing period, preventing a decrease in the signal processing capability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

Figure 6:
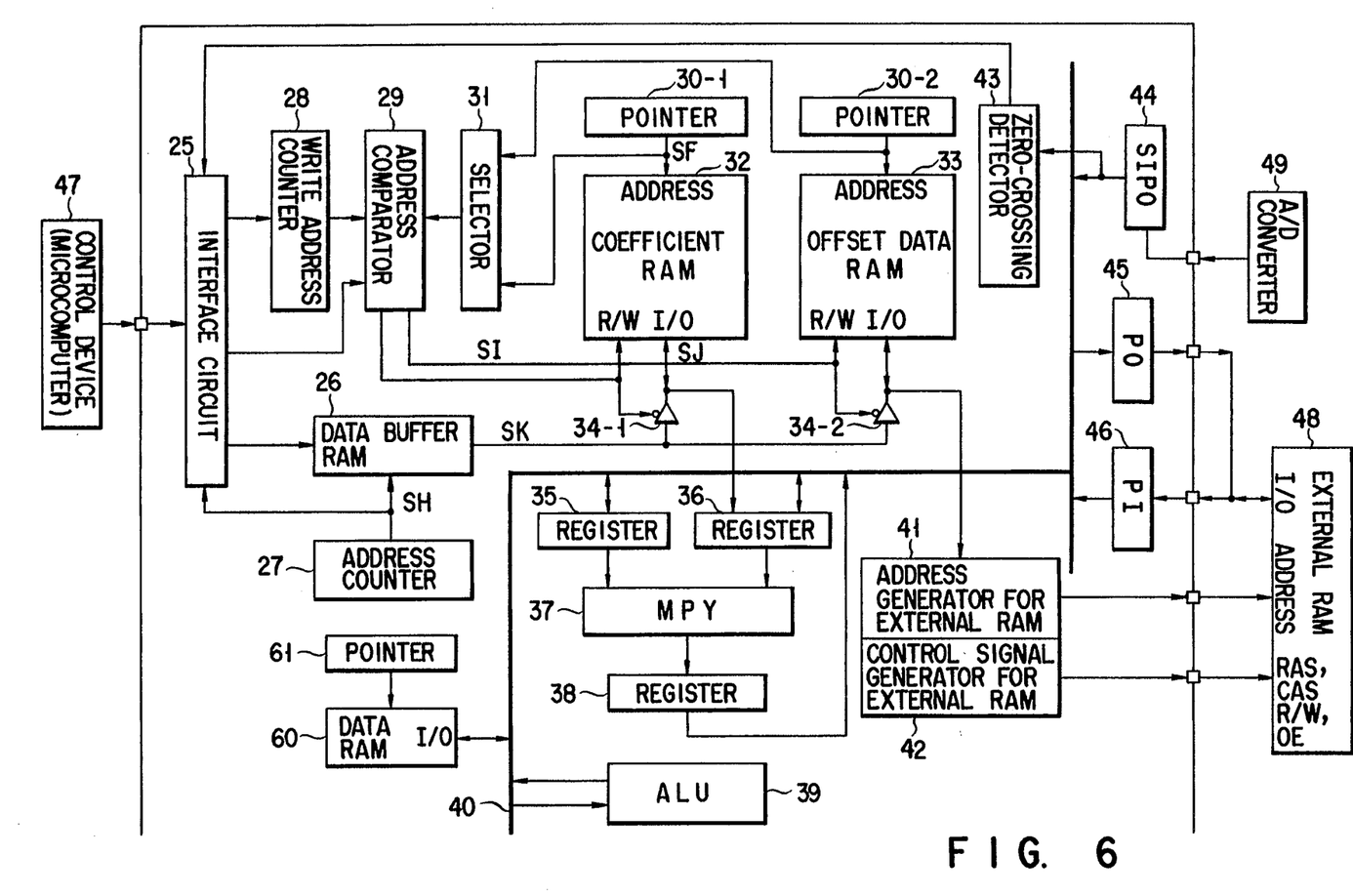
FIG. 6 is a block diagram of a digital signal processor according to an embodiment of the present invention.

FIG. 6 is a block diagram of a digital signal processor (DSP) according to an embodiment of the present invention. This DSP performs multiplication in digital signal processing, such as treatment of sound quality, the reproduction of sound field, and the addition of reverberation, using various types of filtering, including graphic equalizers.

The DSP is composed of an interface circuit 25, a data buffer RAM 26 for storing data in sequence, a data buffer RAM address counter 27, a data write address counter 28, an address comparator 29, pointers 30-1, 30-2, a selector 31, a coefficient RAM 32, an offset data RAM 33, tri-state buffers 34-1, 34-2 controlled by the write enable signal, a multiplicand register 35, a coefficient register 36, a multiplier (MPY) 37, a register 38 for storing the result of multiplication, an ALU 39, a data bus 40, an address generator circuit 41 for producing addresses for an externally connected RAM, a control signal generator circuit 42 for producing a control signal for the externally connected RAM, an acoustic signal zero-crossing detector circuit 43, a serial input register (SIPO) 44, a parallel output register (PO) 45, a parallel input register (PI) 46, a data RAM 60, and a pointer 61.

The transmitted data from the control device 47, such as a microcomputers, is supplied to the interface circuit 25, which is also supplied with the output of the address counter 27 and the output of the zero-crossing detector circuit 43. The data write start address from the interface circuit 25 is supplied to the counter 28. The address comparator 29 compares the data write address from the counter 28 with the address selected by the selector 31, which selects either the address of the coefficient RAM 32 from the pointer 30-1 or the address of the offset data RAM 33 from the pointer 30-2. After these addresses agree with each other and the control device 47 produces a write permit signal via the interface 25, the read/write terminals R/W of the coefficient RAM 32 and the offset data RAM 33 are supplied with a write enable signal for write permission. This write enable signal is also supplied to the control terminals of the tri-state buffers 34-1 and 34-2 to bring those RAMs in the write enable state.

The data to be changed is supplied from the control device 47 via the interface circuit 25 to the data buffer RAM 26, and is stored in the location with the address specified by the address counter 27. The data to be changed from the data buffer RAM 26 is supplied the input terminal of each of tri-state buffers 34-1 and 34-2. The address from the pointer 30-1 is supplied to the address input terminal of the coefficient RAM 32, whereas the address from the pointer 30-2 is supplied to the address input terminal of the offset data RAM 33.

The input/output terminal I/O of the coefficient RAM 32 is connected to a first input terminal of the coefficient register 36, to which the coefficient RAM 32 supplies the coefficient data that serves as the multiplier in the multiplier circuit 37. A second input terminal of the coefficient register 36 is connected to the data bus 40, which is also connected to the input terminal of the multiplicand register 35. The output of each of the multiplicand register 35 and coefficient register 36 is supplied to the multiplier 37. The output of the multiplier 37 is supplied to the register 38, the output of which is supplied onto the data bus 40.

The ALU 39, which is supplied with the data to be operated on via the data bus 40, supplies the calculation result onto the data bus 40.

The offset data from the data input/output terminal I/O of the offset data RAM 33 is supplied to the address generator circuit 41, which produces addresses for the externally connected RAM 48, and to the control signal generator circuit 42, which produces control signals for the RAM 48. The address input terminal of the RAM 48 is supplied with the address produced at the address generator circuit 41 based on the offset data read from the offset data RAM 33. The control signals produced at the control signal generator circuit 42, specifically the row address strobe signal, the column address strobe signal, the read/write signal, and the output enable signal, are supplied to the control input terminals RAS, CAS, R/W, and OE of the RAM 48, respectively.

The input/output terminal I/O of the RAM 48 is connected to each of the output terminal of the parallel output register (PO) 45 and the input terminal of the parallel input register (PI) 46. The data read from the RAM 48 is supplied to the register 46, whose output is supplied onto the data bus 40. The data read from the data bus into the register 45 is written into the RAM 48.

An acoustic signal is supplied to the A/D converter 49, which converts it into digital data. The digital data from the converter 49 is supplied to the serial input register (SIPO) 44, whose output is supplied onto the data bus 40 and to the zero-crossing detector 43.

The operation of the circuitry thus constructed will be explained. For example, the calculation with IIR quadratic digital filters used in signal processing by graphic equalizers requires five or more coefficients. The calculation with low-pass filters, which have a cut-off frequency of 250 Hz or less, needs coefficient double-precision operation, which involves 10 or more coefficients. To change the filter characteristics of the equalizer in real time, it is necessary to rewrite those coefficient data at a time (during a single sampling time).

The number of data items to be transmitted from the control device 47 to the data buffer RAM 26 is set in the interface circuit 25. Then, the control device 47 writes the data to be changed into the data buffer RAM 26 via the interface circuit 25. The address counter 27 starts counting from zero. Its count increases by one every time data is written into the buffer RAM 25. When as many data as the number set previously have been written into the data buffer RAM 26, the counter 27 is cleared to zero and stops counting. The writing of data from the control device 47 into the data buffer RAM 26 is executed independently of the progress of the program (digital signal processing).

Because the filter coefficients are arranged in descending order or in ascending order of the addresses in the coefficient RAM 32 (here, they are assumed to be in ascending order), the data to be changed are written into the data buffer RAM 26 by the control device 47 via the interface circuit 25, starting at count "0" of the address counter 27 so as to correspond to the arrangement of coefficient data in the coefficient RAM 32. Then, the data write start address from the control device 47 is set in the write address counter 28. This address setting may be executed before the data is written into the data buffer RAM 26. In this situation, the control device 47 transmits the write start signal, allowing the interface circuit 25 to supply a write permit signal to the address comparator 29. The pointer 30-1 is incremented by 1 as the program proceeds, allowing the coefficient data from the coefficient RAM 32 to be set in the register 36. When the address of the coefficient RAM 32 from the pointer 30-1 agrees with the data write (start) address from the address counter 28, the address comparator 29 supplies a write enable signal to the coefficient RAM 32. During the time when those addresses are in agreement with each other, the data to be changed from the location with address "0" in the data buffer RAM 26 is written into the coefficient RAM 32, and at the same time, the coefficient data supplied to the coefficient register 36 is changed from the output data of the coefficient RAM 32 to the output data (the data to be changed) of the data buffer RAM 26. As soon as the coefficient pointer 30-1 is incremented by 1, the data write address counter 28 and address counter 27 are also incremented by 1. This action is continued until the count of the address counter 27 reaches the previously set number of the data to be changed. After the final data has been written into the coefficient RAM 32 and coefficient register 36, the write address counter 28 is incremented by 1 and stopped, and the address counter 27 is cleared to "0" and stopped.

The description has been made, focusing on the change of data in the coefficient RAM 32. This basically applies to the change of data in the offset data RAM 33. The data read from the offset data RAM 33 is supplied to the address generator circuit 41 for the external RAM 48 and to the control signal generator circuit 42 for the RAM 48. The address generator circuit 41 produces addresses for the external RAM 48. The control signal generator circuit 42 produces various control signals to control the operation of the external RAM 48, including a row-address strobe signal, a column-address strobe signal, a read/write signal, and an output enable signal. Data is read from or written into the external RAM 48 by means of the address from the address generator circuit 41 and the output of the control signal generator circuit 42.

As described above, the data write address from the address counter 28 is compared with the address supplied from the pointer 30-1 to the coefficient RAM 32. During the time when those addresses are in agreement with each other, the data (coefficient data) read from the data buffer RAM 26 is written into the coefficient RAM 32, and at the same time, is set in the coefficient register 36. This allows the coefficient data to be given to the coefficient register 36 without interruption even when the coefficient data is being written into the coefficient RAM 32, achieving continuous filter calculation. Thus, all necessary coefficients for filter calculation can be changed at a time. It is possible to make full use of the signal processing period of time because of no empty area in the signal processing period. These features prevent the DSP's signal processing capability from degrading.

Figure 7:
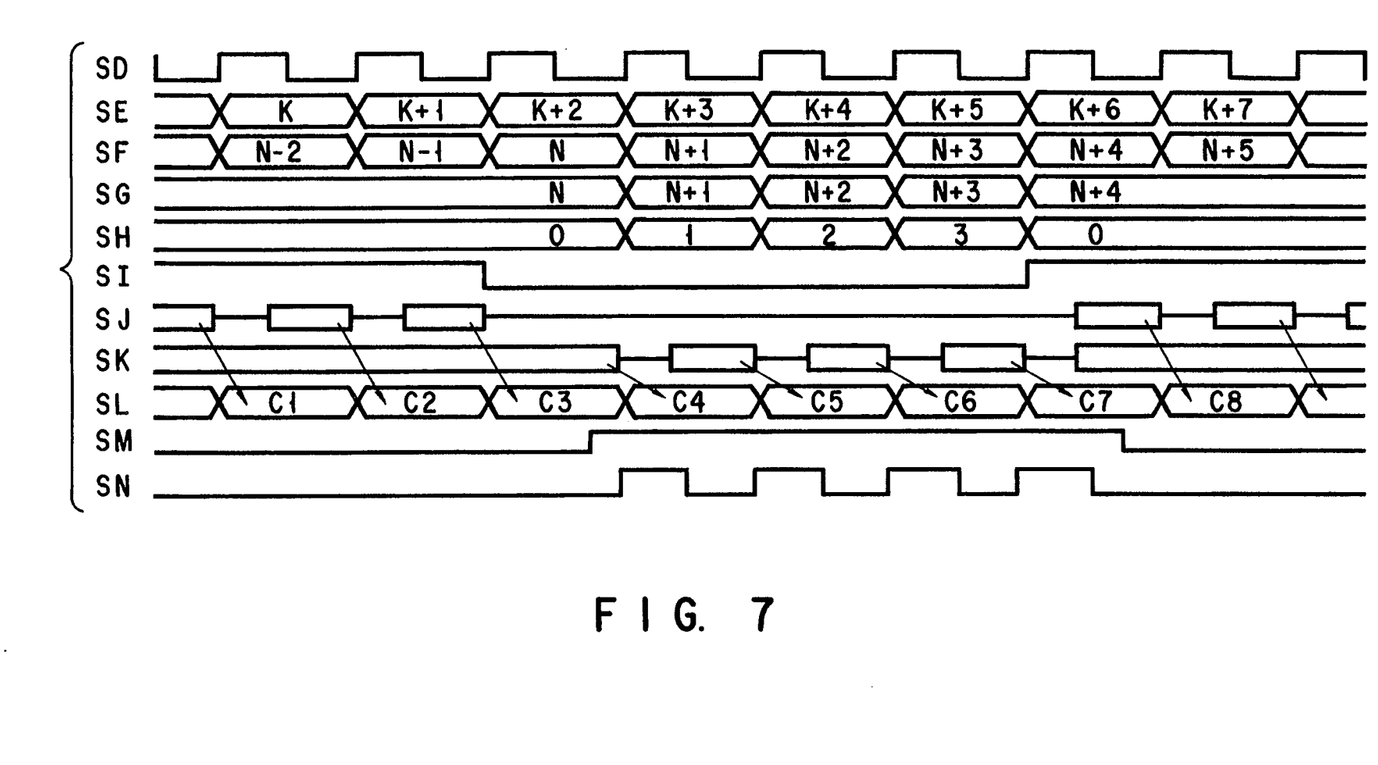
FIG. 7 is a timing chart for explaining the operation of the circuit of FIG. 6.

FIG. 7 is a timing chart for the above-described operation, showing an example with four coefficients to be changed. In the figure, SD indicates a system clock for the digital signal processor, and SE represents the count of the program counter (not shown). The program counter's count SE counts up in synchronization with the system clock SD. SF indicates an address in the coefficient RAM 32, SG the parameter write address, SH an address in the data buffer RAM 26, SI the write enable signal to the coefficient RAM 32 or offset data RAM 33, SJ the data read from the coefficient RAM 32, SK the data read from the data buffer RAM 26, SL the data stored in the coefficient register 36, SM the count enable period for the counter 27, and SN the count clock of the counter 27.

As seen from the FIG. 7, during the time when the data is being written from the data buffer RAM 26 into the coefficient RAM 32 with the write enable signal SI being active (in the low level), the output SJ of the RAM 32 is in the high-impedance state. In this situation, the tri-state buffer 34-1 or 34-2 is turned on, with the result that the data to be changed is transferred from the data buffer RAM 26 directly to the coefficient register 36 without interruption, in synchronization with the clock of the address counter 27.

Figure 8A:
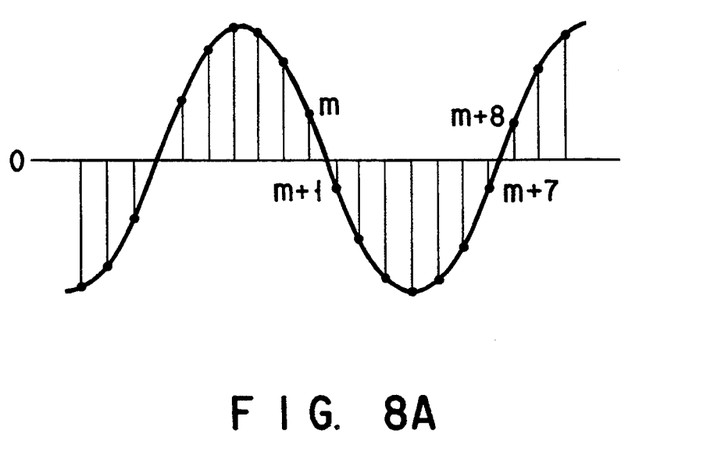
FIGS. 8A and 8B illustrate acoustic waveforms for explaining the change of data based on zero crossing.
Figure 8B:
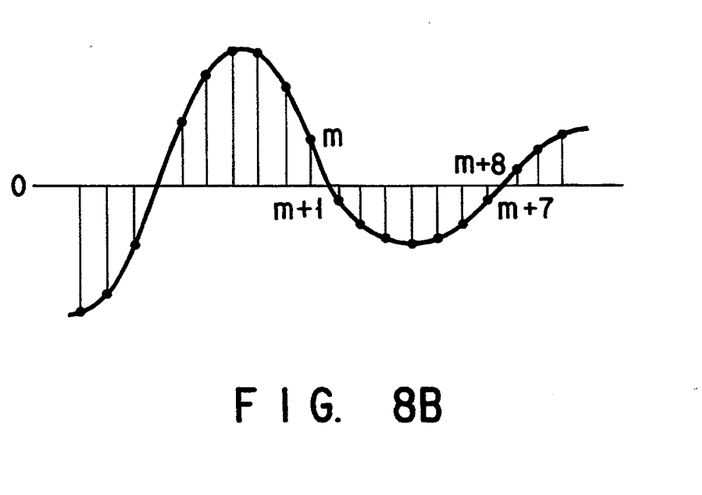

For digital signal processing of acoustic signals, sign-added numeral representation (such as 2's compliment representation) is used for sampling data as shown in FIGS. 8A and 8B. Therefore, when data changes from the plus side to the minus side (m→m+1) or the minus side to the plus side (m+7→m+8) with the value "0" as a reference, the sign bit changes from "1" to "0" or "0" to "1" ( this change is referred to as zero crossing, hereinafter). After the write start signal has been set in the interface circuit 25, the zero-crossing detector circuit 43 detects the sign bit of each of the preceding sampling input data and the present sampling input data, and supplies a write permit signal to the address comparator 29 to execute the rewriting of the data.

Since data in the vicinity of zero crossing point is as small as zero, multiplying it by the data (especially the gain parameter) creates only a small change. This makes the processed signal output data less liable to take discontinuous waveforms, allowing the change of data without introducing noises. FIG. 8A shows an acoustic signal before data change, and FIG. 8B represents the acoustic signal undergoing data change at zero crossing point. As seen from the waveform of FIG. 8B, for example, the acoustic waveform after the portion between points m and m+1 has undergone data change.

Application of the aforementioned DSP to a graphic equalizer and sound field control will be explained.

Figure 9:
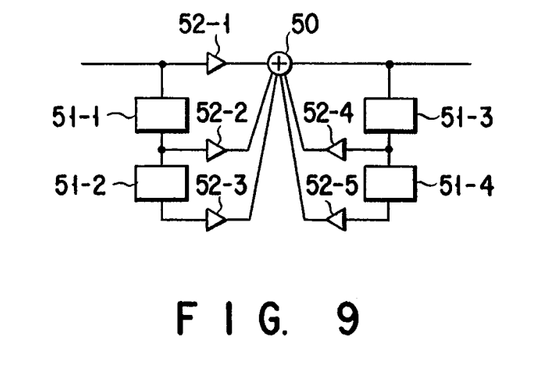
FIG. 9 is a block diagram of an IIR quadratic digital filter, which is an application of a digital signal processor according to the present invention.
Figure 10:
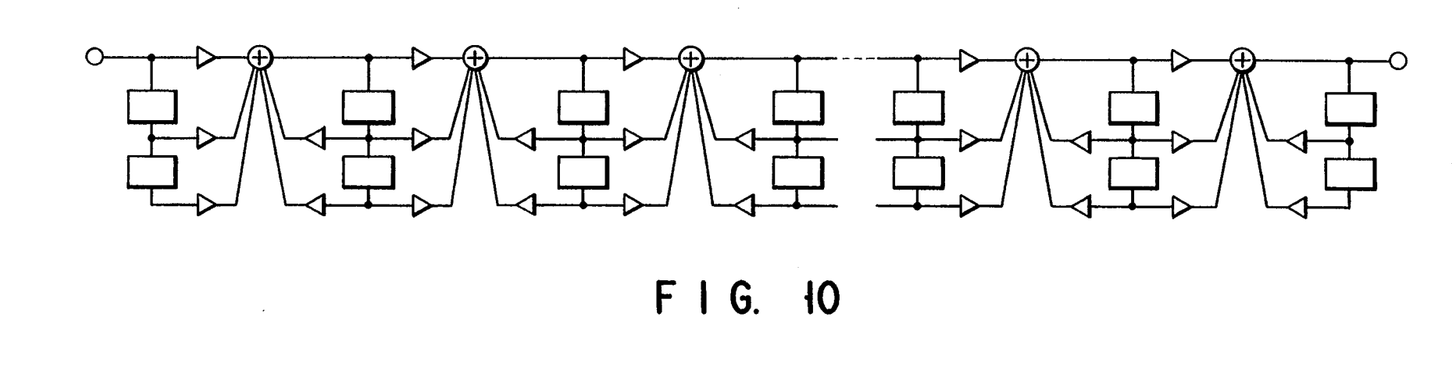
FIG. 10 is a block diagram of a graphic equalizer consisting of IIR digital filters of FIG. 9 connected in series.

The graphic equalizer adjusts sound quality by controlling the frequency characteristics. Several bands of graphic equalizers can be realized by connecting FIG. 9 IIR quadratic digital filters in series as shown in FIG. 10. The IIR quadratic digital filter shown in FIG. 9 is composed of a digital adder 50, delay circuits 51-1 to 51-4, which are composed of shift registers and cause a single sample period delay, and digital multipliers 52-1 to 52-5 with specified coefficients. The data items delayed, on a data basis, by delay circuits 51-1 to 51-4 are multiplied by the coefficients of multiplier circuits 52-1 to 52-5, respectively. The multiplication results are then added to each other at the adder 50. The frequency characteristics can be controlled by changing the coefficient data (for example, 5 for single precision and 10 for double precision) of the IIR quadratic digital filter.

In a case where the DSP of FIG. 6 is used in a graphic equalizer, a single sampling period delay is introduced by controlling the timing of reading from and writing into the data RAM 60. That is, instead of using shift registers for delay, the RAM 60 is used for delaying of the data. Coefficient data can be changed by writing the data to be changed into the coefficient RAM 32. The operation of a graphic equalizer can be achieved by performing operations, including multiplication and addition, with the multiplier 37 and the ALU 39.

Figure 11A:
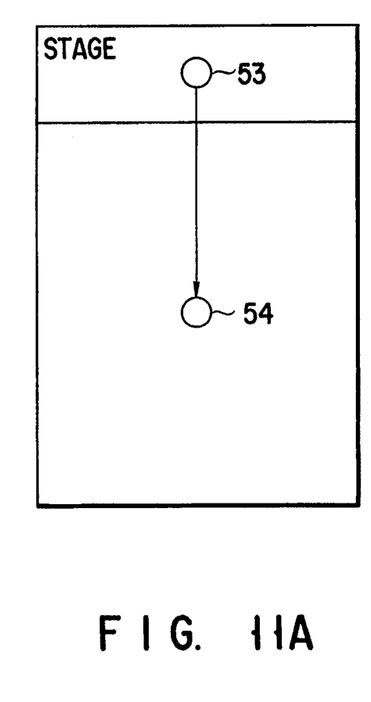
FIGS. 11A to 11C illustrate how sound travels within a concert hall with the aim of explaining the control of sound field by means of a digital signal processor according to the present invention.
Figure 11B:
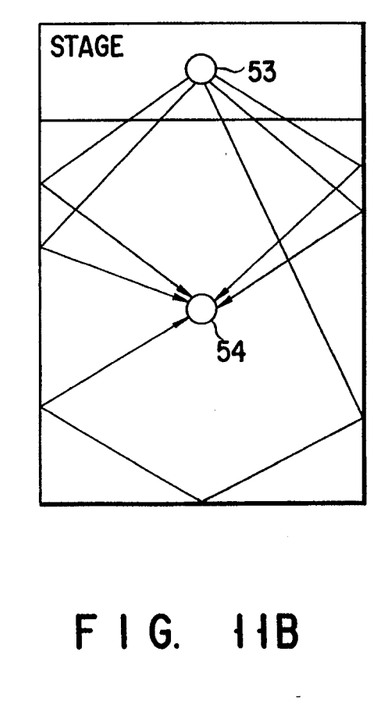
Figure 11C:
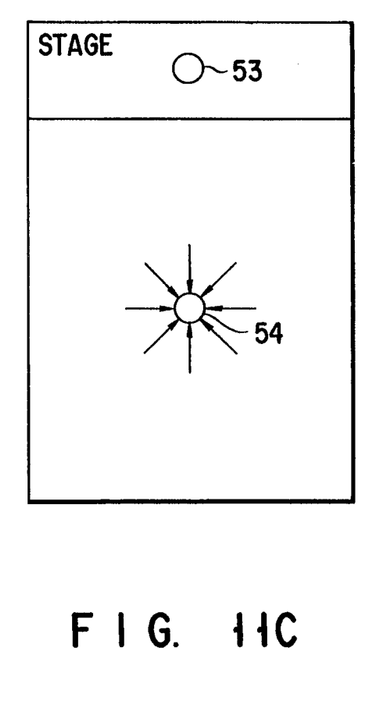
Figure 12:
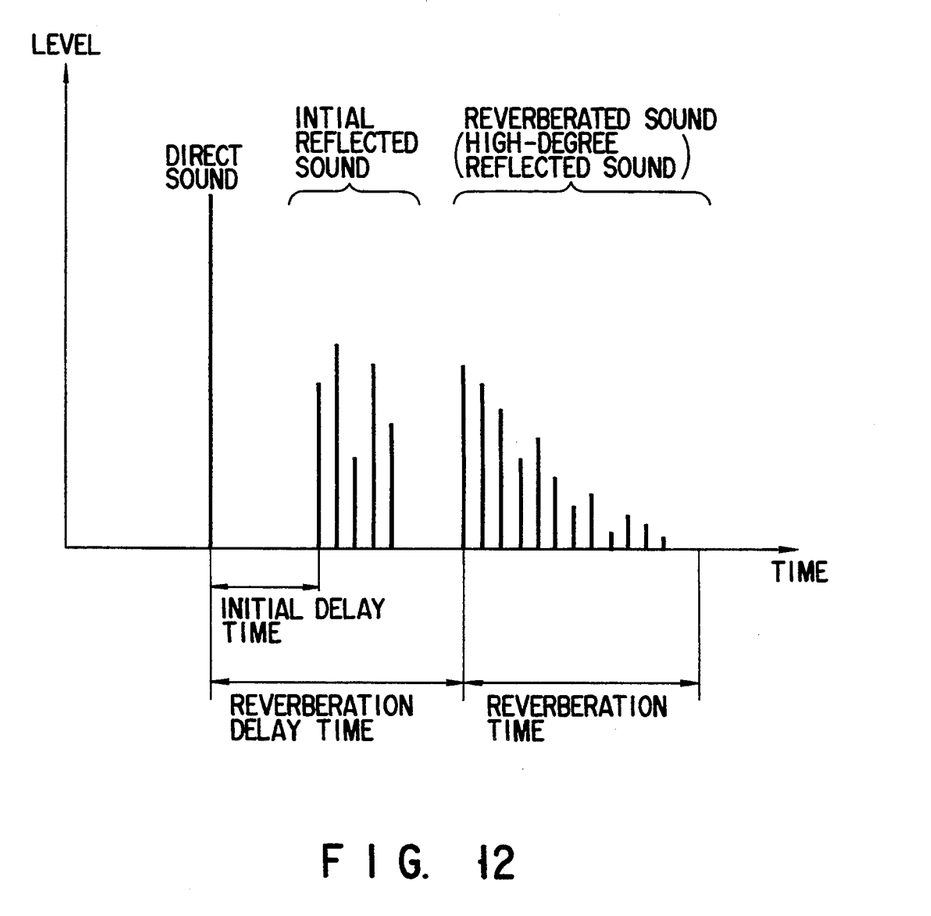
FIG. 12 is a diagram showing the echo pattern where the path that sound takes from the sound source to the listener is developed over the time axis.

FIGS. 11A to 11C illustrate the way in which sound travels within the concert hall. The paths along which sound travels from the sound source 53 to the listener 54 are categorized into a direct sound shown in FIG. 11A, an initial reflected sound reaching the listener 54 after having been reflected once to several times by walls, the ceiling, the floor, and the like as shown in FIG. 11B, and a reverberated sound (high-degree reflected sound) finally reaching the listener 54 in all directions after repetition of complex reverberation as shown in FIG. 11C. In FIG. 12, this relationship is developed over the time axis in the form of an echo pattern.

Use of the DSP of FIG. 6 allows simulation of the above-mentioned complicated initial reflected sound or reverberated sound. Such simulation is called sound field control. Sound field control is achieved by delaying the input signal (for a time of the order of msec., longer than the sampling time) for fine control of level and phase. For example, the sampling time for a CD player is nearly 22.7 $\mu$sec. Reflected sounds are generated by writing the input acoustic signal into the external RAN 48, reading the offset address data (corresponding to the delay time of each reflected sound) from the offset data RAN 33, supplying to the external RAM 48 the address produced at the address generator circuit 41, and reading the data corresponding the address into the DSP. Based on the read-out reflected sound, the level and phase of reflected sound and the synthesis of all reflected sounds (sound field simulation) are realized by multiplication and addition using the multiplier 37, adder (ALU) 39, coefficient RAM 32, etc. To change the hall sound field to be simulated, the coefficient data and the offset address data are changed.

As described above, in the present invention, after the data necessary for multiplication or for generating addresses for the external memory has been transmitted from the control device, and then a plurality of data items have been written into the buffer memory, the control signals for writing the data read from the buffer memory into the internal memory are produced by comparing the address set in the internal memory such as coefficient RAM and offset data RAM by the control device, with the address in the internal memory controlled by the program. This makes it possible to change the data without interrupting the digital signal processing when the operator reproduces the desired sound field or changes the characteristics of the graphic equalizer, while listening to music. The data read from the buffer memory is written into the internal memory, and at the same time, is also used for multiplication or for generating addresses for the external memory. Thus, neither the signal processing operation with the changed data nor the change of data for the internal memory has any effect on the programmed digital signal processing. As a result, the signal processing capability of the DSP is not degraded at all. Unlike the second conventional method described earlier, it is not necessary to provide an empty area in one unit of signal processing (for example, in a single sampling period) for data change. This makes it possible to achieve full use of one unit of signal processing, thereby allowing simultaneous change of parameters without degrading the signal processing capability. Because data change is made after detection of the zero crossing of the digital signal, the processed signal output data is less liable to have a discontinuous waveform, which allows the change of data in real time without introducing noises.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A digital signal processor, in which a control device sequentially transmits to and writes into a buffer memory data necessary for multiplication in a multiplier or for address generation for an external memory, and then the data in said buffer memory is written into an internal memory during a single sampling period, and which comprises:
   first means for generating control signals to write the data read from said buffer memory into said internal memory by comparing an address set by said control device in said internal memory into which the data in said buffer memory is written, with an address in said internal memory controlled by a program; and
   second means for writing the data read from said buffer memory into said internal memory and also using the same data read from said buffer memory for multiplication in the multiplier or for address generation for the external memory.

2. A digital signal processor according to claim 1, further comprising zero-crossing detector means for detecting zero-crossing of a digital signal corresponding to an acoustic signal changed based on data, wherein the data read from said buffer memory is written into said internal memory, and is also used for multiplication or for address generation for the external memory, when said zero-crossing detector means has detected the zero crossing.

3. A digital signal processor according to claim 1, wherein said internal memory is a coefficient RAM, and said data is coefficient data for a multiplier, the coefficient data being used in multiplication.

4. A digital signal processor according to claim 1, wherein said internal memory is an offset data RAM, and said data is offset data in the offset data RAM, said offset data being used to generate addresses for said external memory.

5. A digital signal processing device comprising:
   data buffer memory means for storing data to be changed transmitted from a control device;

first address counter means for specifying a first address in said data buffer memory means;

second address counter means for receiving a change start address of the data from said control device, and then producing a data write address;

internal memory means for storing the data;

pointer means for specifying a second address in said internal memory means;

address comparator means for comparing the change start address from said second address counter means with the second address from said pointer means, and, when these addresses coincide with each other, bringing said internal memory means in a write enable state; and transfer means for transferring the data to be changed in said data buffer memory means to said internal memory means when said address comparator means has brought said internal memory means in the write enable state.

6. A digital signal processor according to claim 5, further comprising zero-crossing detector means for detecting zero-crossing of a digital signal corresponding to an acoustic signal, wherein the data read from said data buffer memory means is written into said internal memory means, and is also used for multiplication in a multiplier or for address generation for an external memory, when said zero-crossing detector means has detected the zero crossing.

7. A digital signal processor according to claim 5, wherein said internal memory means contains a coefficient RAM.

8. A digital signal processor according to claim 5, wherein said internal memory means contains an offset data RAM.

9. A digital signal processor operated under control of a program, comprising:

an internal memory in which first data are stored;

a register connected to said internal memory and which receives said first data;

a logic circuit connected to said register, said logic circuit receiving said first data from said register and performing predetermined functions using said first data;

a data buffer memory in which second data used to replace selected ones of said first data are stored;

a write start address counter containing a write start address of said second data;

a pointer containing a current address of said internal memory;

a comparator connected to pointer and said write start address counter for comparing said current address with said write start address;

a control device for controlling transfer of said second data into said buffer memory; and means for simultaneously writing said second data into said internal memory and transferring said second data into said register when said current address and said write start address are determined to coincide using said comparator.

* * * * *